United States Patent
Smith et al.

(10) Patent No.: US 7,607,501 B2
(45) Date of Patent: Oct. 27, 2009

(54) COOLING SYSTEM FOR A VEHICLE BATTERY

(75) Inventors: Mark G. Smith, Canton, MI (US);
Halim Wijaya, Canton, MI (US); Jacob Mathews, Canton, MI (US);
Ranganathan Madhaven, Canton, MI (US); Patrick Daniel Maguire, Ann Arbor, MI (US); James Castellano, Northville, MI (US); Douglas Zhu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 194 days.

(21) Appl. No.: 11/276,064

(22) Filed: Feb. 13, 2006

(65) Prior Publication Data

US 2006/0116062 A1    Jun. 1, 2006

Related U.S. Application Data

(63) Continuation of application No. 10/605,179, filed on Sep. 12, 2003, now Pat. No. 7,025,159.

(51) Int. Cl.
*B60K 11/08* (2006.01)

(52) U.S. Cl. ..................... 180/68.1; 180/68.5

(58) Field of Classification Search ............... 180/68.1, 180/68.2, 68.3, 68.5, 65.1, 65.2, 65.3, 65.4; 903/907; 429/26, 100, 120; 454/454, 151
See application file for complete search history.

(56) References Cited

U.S. PATENT DOCUMENTS

| | | | |
|---|---|---|---|
| 4,306,000 A | 12/1981 | Kodali | |
| 5,390,508 A | 2/1995 | Benedict | |
| 5,390,754 A | 2/1995 | Masuyama et al. | |
| 5,392,873 A | 2/1995 | Masuyama et al. | |
| 5,490,572 A | 2/1996 | Tajiri et al. | |
| 5,582,234 A * | 12/1996 | Samukawa et al. | 165/204 |
| 5,730,237 A | 3/1998 | Matsuki et al. | |
| 5,937,664 A * | 8/1999 | Matsuno et al. | 62/259.2 |
| 5,983,657 A * | 11/1999 | Murata et al. | 62/228.3 |
| 6,094,927 A | 8/2000 | Anazawa et al. | |
| 6,138,466 A | 10/2000 | Lake et al. | |
| 6,186,254 B1 | 2/2001 | Mufford et al. | |
| 6,188,574 B1 | 2/2001 | Anazawa | |
| 6,204,769 B1 | 3/2001 | Arai et al. | |

(Continued)

FOREIGN PATENT DOCUMENTS

JP    2003-047508    *    1/2004

*Primary Examiner*—Jeffrey J Restifo
(74) *Attorney, Agent, or Firm*—David B. Kelley; Brooks Kushman P.C.

(57) ABSTRACT

A cooling system for a battery in a vehicle does not use air from the vehicle passenger compartment, but rather, takes in ambient air from outside the vehicle. When the temperature of the ambient air outside the vehicle is low enough, the air is moved through a duct system by a pair of fans and blown across a battery assembly. When the temperature of the ambient air outside the vehicle is too warm to cool the battery directly, it is first passed through an evaporator coil where it exchanges heat with a refrigerant, prior to being blown across the battery assembly. The cooling air may be recirculated across the battery assembly, or exhausted from the vehicle through an air extractor.

19 Claims, 8 Drawing Sheets

U.S. PATENT DOCUMENTS

| | | |
|---|---|---|
| 6,220,383 B1 | 4/2001 | Muraki et al. |
| 6,315,069 B1 | 11/2001 | Suba et al. |
| 6,394,210 B2 | 5/2002 | Matsuda et al. |
| 6,422,027 B1 | 7/2002 | Coates, Jr. et al. |
| 6,443,253 B1 | 9/2002 | Whitehead et al. |
| 6,457,542 B1 | 10/2002 | Hosono et al. |
| 6,495,991 B2 | 12/2002 | Yuasa et al. |
| 6,541,151 B2 | 4/2003 | Minamiura et al. |
| 6,548,199 B1 | 4/2003 | Tanaka et al. |
| 6,651,761 B1 | 11/2003 | Hrovat et al. |
| 6,662,891 B2 | 12/2003 | Misu et al. |
| 6,750,630 B2 | 6/2004 | Inoue et al. |
| 6,782,914 B2 * | 8/2004 | Kami et al. ................ 137/312 |
| 6,800,385 B2 | 10/2004 | Harth |
| 6,805,984 B2 | 10/2004 | Harth |
| 6,889,672 B2 * | 5/2005 | Criddle et al. ........... 123/559.1 |
| 6,892,713 B2 * | 5/2005 | Criddle et al. ........... 123/559.1 |
| 6,991,531 B2 * | 1/2006 | Wijaya et al. ............... 454/130 |
| 7,025,159 B2 * | 4/2006 | Smith et al. ................ 180/68.1 |
| 7,044,848 B2 * | 5/2006 | Wijaya et al. ............... 454/128 |
| 7,048,321 B2 * | 5/2006 | Bandoh et al. ............. 296/37.8 |
| 7,079,379 B2 * | 7/2006 | Yamaguchi et al. ......... 361/676 |
| 7,152,417 B2 * | 12/2006 | Morishita et al. ............. 62/186 |
| 7,240,752 B2 * | 7/2007 | Takahashi et al. .......... 180/68.1 |
| 2003/0217559 A1 | 11/2003 | Ieda et al. |
| 2004/0062955 A1 | 4/2004 | Kubota et al. |
| 2004/0106027 A1 | 6/2004 | Imaseki et al. |

* cited by examiner

COOLING SYSTEM FOR A VEHICLE BATTERY

CROSS-REFERENCE TO RELATED APPLICATIONS

This application is a continuation of application Ser. No. 10/605,179 filed Sep. 12, 2003, now U.S. Pat. No. 7,025,159 issued on 11 Apr. 2006, which is hereby incorporated herein by reference.

BACKGROUND OF THE INVENTION

1. Field of the Invention

The present invention relates to a system for cooling a vehicle battery.

2. Background Art

There are a variety of vehicles today which utilize electricity, and in particular an electric motor, to at least assist in powering the vehicle. For example, there are electric vehicles, which are powered exclusively by an electric motor; hybrid electric vehicles (HEV), which may be selectively powered by an internal combustion engine or an electric motor; and fuel cell vehicles, or hybrid fuel cell vehicles, just to name a few. The electric motor used in such vehicles may have an electrical power source such as a fuel cell or a battery.

In the case of a battery used to provide power to an electric motor to drive a vehicle, the temperature of the battery can increase significantly when the motor is used for extended periods of time. The increase in battery temperature may be compounded when the battery is confined to a relatively small, enclosed space. If the increase in battery temperature is left unchecked, the battery life may be reduced. Thus, it is desirable to provide a system for cooling a battery, or batteries, in a vehicle to keep the battery temperature low enough that the battery life is not reduced.

One attempt to provide cooling to a battery in an electric automobile is described in U.S. Pat. No. 5,490,572 issued to Tajiri et al. on Feb. 13, 1996. Tajiri et al. describes a system for cooling a number of batteries in a battery chamber. Air from outside the vehicle may be taken directly into the battery chamber, or the air may first pass through a heat exchanger to cool it before it flows into the battery chamber. Some of the air that flows through the heat exchanger may flow into a vehicle passenger compartment, rather than into the battery chamber.

Thus, in the system described in Tajiri et al., the same heat exchanger is used to cool both passenger compartment air and battery compartment air. A number of air discharge ports may be opened or closed to control the flow of air into the passenger compartment; however, the temperature of the air flowing into the passenger compartment will be the same as the temperature of the air flowing into the battery compartment. This is because a single heat exchanger is used to cool the air flowing into both spaces. The air that flows into the battery chamber is discharged outside the vehicle, while the air flowing into the passenger compartment may be discharged outside the vehicle, or recirculated back into the passenger compartment.

One limitation of the system described in Tajiri et al. is the lack of separate controls for the air flowing into the passenger compartment and the battery compartment. For example, if the temperature of the batteries increases such that the system attempts to provide cool air to the battery compartment, and the temperature of the air outside the vehicle is not low enough to adequately cool the batteries, a damper will be closed to force air through the heat exchanger for cooling, prior to flowing into the battery chamber. If at the same time, the vehicle occupants request warm air into the passenger compartment, a conflict arises, because there is a single heat exchanger used for both the passenger compartment air and the battery compartment air.

Another limitation of the system described in Tajiri et al. is the inability to recirculate air within the battery chamber. For example, when the batteries need to be cooled, but the vehicle occupants do not wish to receive air cooled by the heat exchanger, air discharge ports leading into the passenger compartment can be closed. Air cooled by the heat exchanger then passes into the battery compartment; however, there is no mechanism for recirculating the air back through the battery compartment. Instead, it is discharged to the ambient environment outside the vehicle. This may be inefficient, since the cooled air passing through the battery compartment may still be at a lower temperature than the ambient air outside the vehicle. In such a situation, it would be beneficial to recirculate the air from the battery compartment back through the heat exchanger where it could be more efficiently cooled than the outside ambient air. Moreover, recirculating the air may provide the added benefit of reducing the moisture content of the air passing through the heat exchanger. This could reduce the amount of condensate formed and help prevent icing of the heat exchanger.

Another system for cooling a battery in a vehicle is described in U.S. Pat. No. 5,937,664 issued to Matsuno et al. on Aug. 17, 1999. Matsuno et al. describes a system for cooling a battery, wherein batteries inside a battery chamber are cooled by air taken from the vehicle passenger compartment. After passing through the battery compartment, the air may be recirculated into the passenger compartment, or discharged through an exhaust duct. One limitation of the system described in Matsuno et al. is its reliance on air from the vehicle passenger compartment to cool the batteries. Because the vehicle occupants determine the passenger compartment temperature based on their own comfort level, the air in the passenger compartment may be too warm to adequately cool the batteries. Just as in the system described in Tajiri et al., such a situation presents a conflict between the comfort level of the vehicle occupants and the need to cool the batteries.

Thus, a need still exists for a system for cooling a vehicle battery that does not rely on passenger compartment air, but rather, can alternatively provide air to cool the batteries taken directly from ambient air outside the vehicle, or air passed through a heat exchanger separate from a heat exchanger used to cool the passenger compartment air. Moreover, there is also a need for a system for cooling a battery that provides for recirculation of the air from the battery compartment and back through a heat exchanger so as to cool the air more efficiently, and thereby provide an energy savings.

SUMMARY OF THE INVENTION

Therefore, a cooling system for a battery in a vehicle having a passenger compartment is provided. The cooling system includes an air intake for receiving air from an ambient environment outside the vehicle. A duct system is capable of providing communication between the air intake and the battery. The duct system is configured to inhibit airflow from the duct system into the vehicle passenger compartment. A fan cooperates with the duct system for moving air through at least a portion of the duct system and across the battery. A heat exchanger cooperates with the duct system and is selectively operable to cool air flowing in the duct system before the flowing air reaches the battery.

The invention also provides a cooling system for a battery in a vehicle having a passenger compartment. The cooling system includes an air intake for receiving ambient air from outside the vehicle. A duct system includes first and second duct subsystems. The first duct subsystem is disposed between the air intake and the battery for providing an air flow path from the air intake to the battery. The second duct subsystem is disposed between the battery and the first duct subsystem, and provides an airflow path from the battery to the first duct subsystem. The duct system is configured to selectively inhibit airflow through at least a portion of the first and second duct subsystems. A fan cooperates with the duct system for moving air through at least a portion of the duct system and across the battery. A heat exchanger cooperates with the duct system and is selectively operable to cool air flowing in the duct system before the flowing air reaches the battery.

The invention further provides a vehicle having a passenger compartment and a battery. The vehicle includes a battery cooling system having an air intake for receiving air from an ambient environment outside the vehicle. A duct system is configured to selectively provide communication between the air intake and the battery, and is further configured to inhibit communication between the passenger compartment and the battery. The battery cooling system also includes a fan that cooperates with the duct system for moving air through at least a portion of the duct system and across the battery. A heat exchanger cooperates with the duct system and is selectively operable to cool air flowing in the duct system before the flowing air reaches the battery.

DETAILED DESCRIPTION OF THE PREFERRED EMBODIMENT(S)

Figure 1:
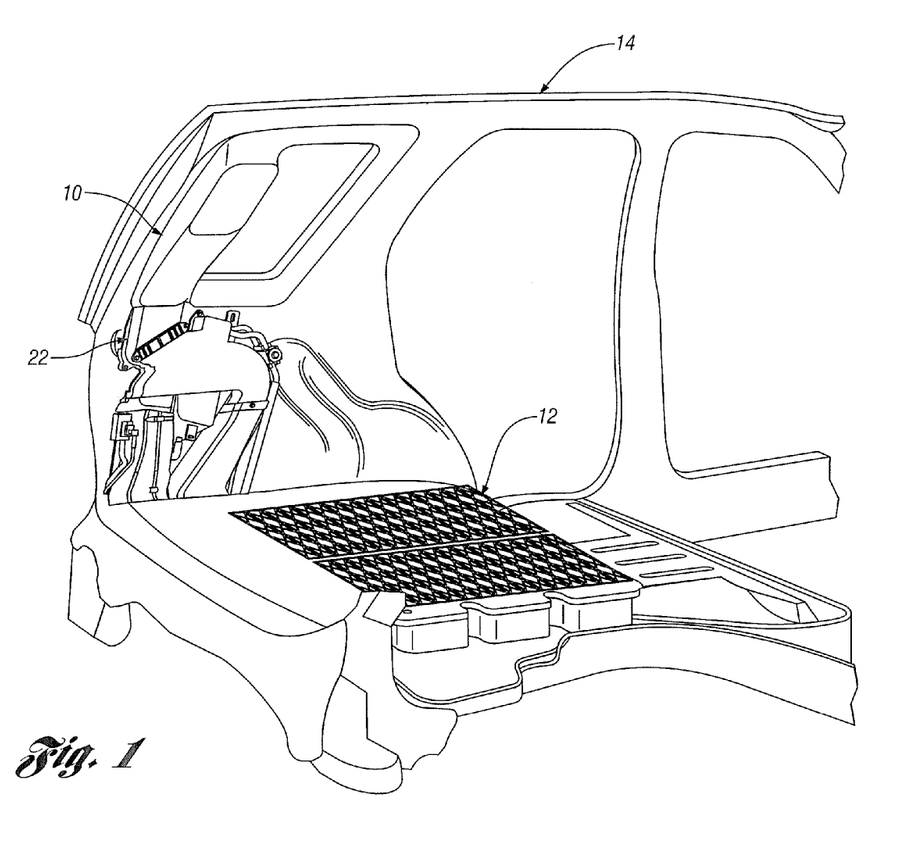
FIG. 1 is a partial fragmentary isometric view of a vehicle, including a battery cooling system in accordance with the present invention.

FIG. 1 shows a cooling system 10 for cooling a battery assembly 12 in a hybrid electric vehicle 14, only a portion of which is shown in FIG. 1. Although the hybrid electric vehicle 14 and its battery assembly 12 are used to illustrate the functionality of the cooling system 10, it is understood that a cooling system, such as the cooling system 10, can be effectively used to cool any number of different systems, in any number of different vehicle types. For example, a pure electric vehicle, a fuel cell vehicle, or a hybrid fuel cell vehicle, may also have battery assemblies or other heat generating equipment that require cooling, and would therefore benefit from the use of a cooling system, such as the cooling system 10.

Figure 2:
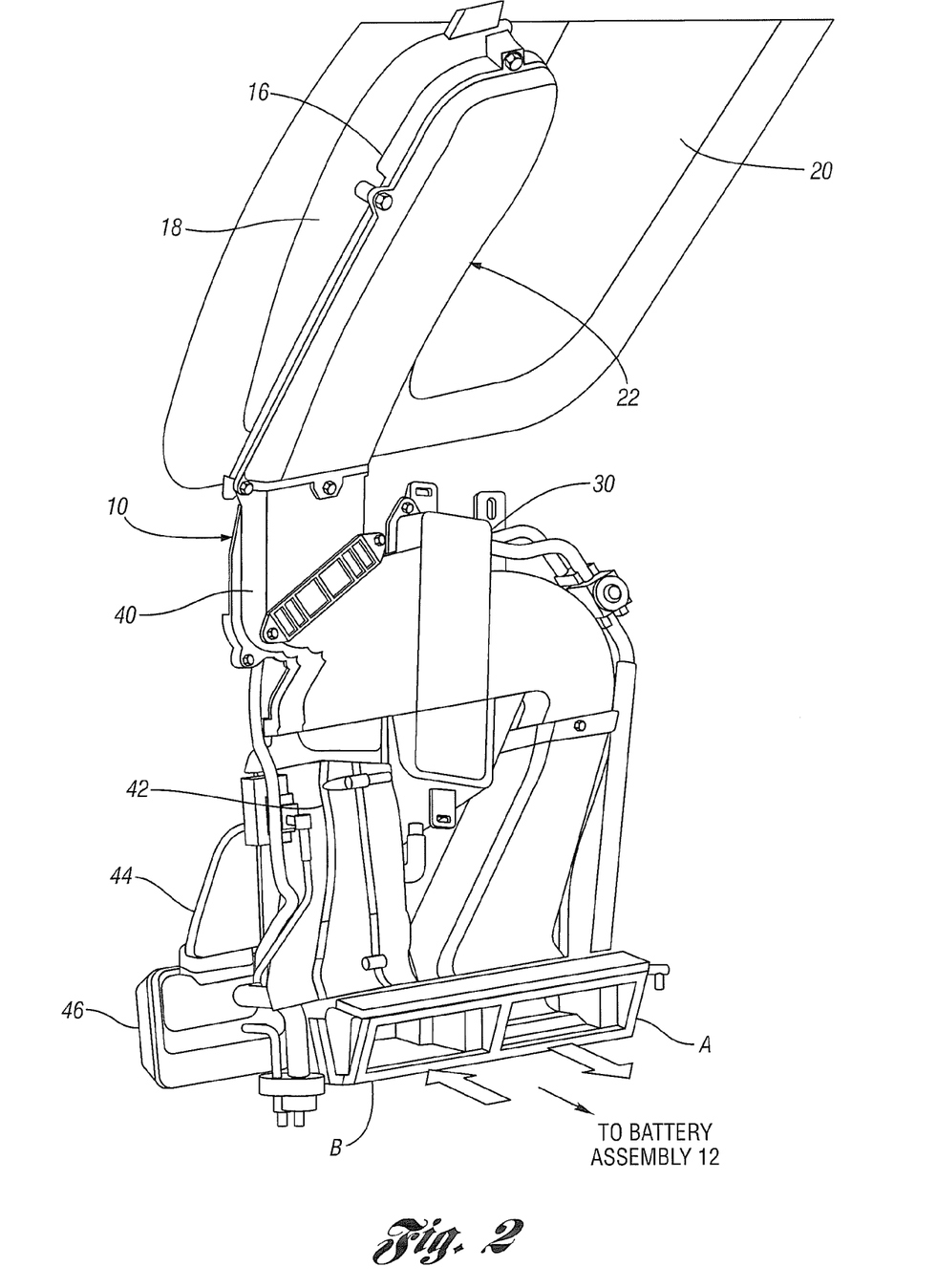
FIG. 2 is a partial fragmentary isometric view of a portion of the battery cooling system, including an air intake and a duct system.
Figure 3:
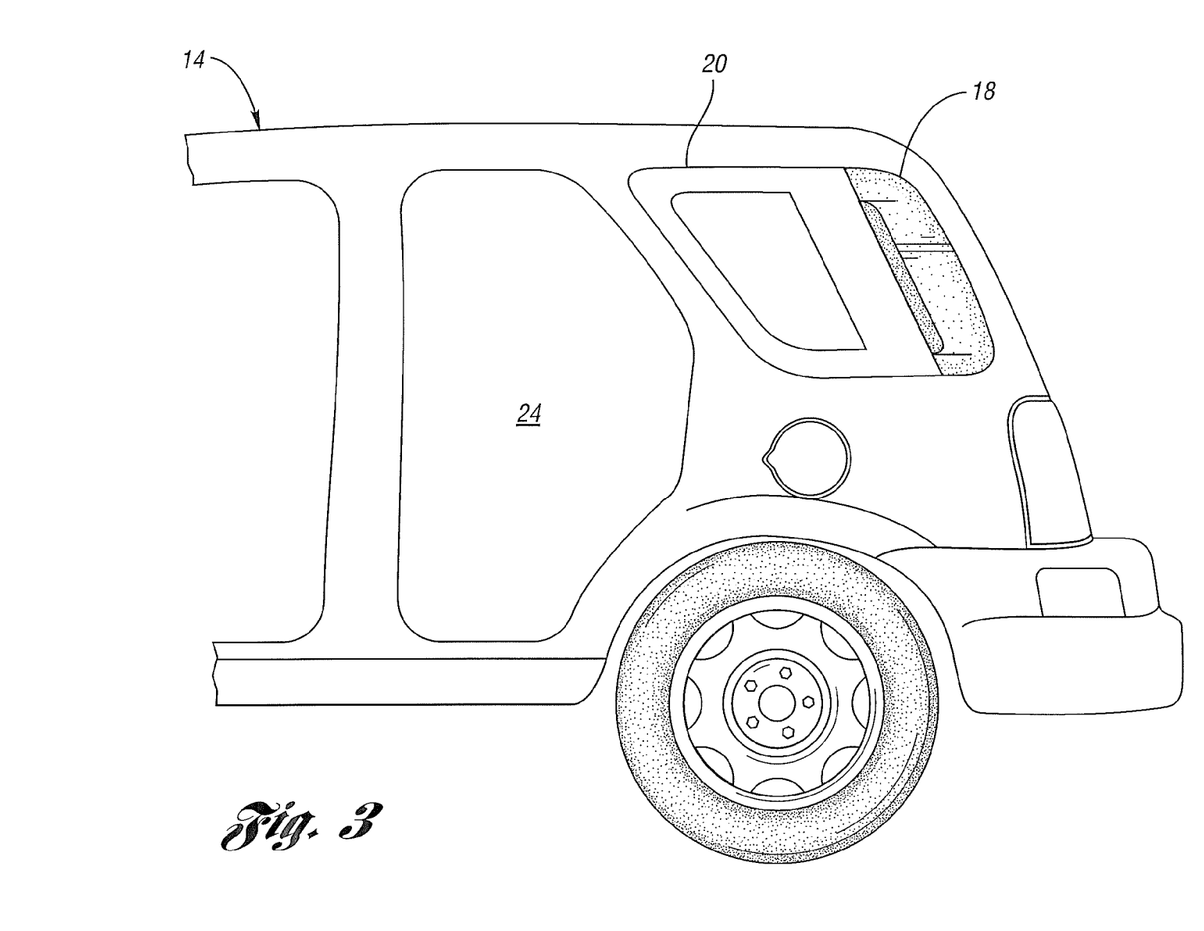
FIG. 3 is a side view of the vehicle shown in FIG. 1, including a vehicle air intake disposed along an edge of a rear quarter window.

As best seen in FIG. 2, the cooling system 10 includes an air intake 16 that is configured to receive air from an ambient environment outside the vehicle 14. In the embodiment shown in FIG. 2, the air intake 16 of the cooling system 10 is connected to a vehicle air intake 18, which is disposed in a portion of a rear quarter window 20. FIG. 3 shows the rear quarter window 20 and a vehicle air intake 18 as viewed from outside the vehicle 14. Of course, a vehicle air intake can be located on other parts of a vehicle; however, having a vehicle air intake, such as the air intake 18, located relatively high-up on a vehicle, may help reduce the intake of water and debris from the road.

One such air intake is described in U.S. Pat. No. 7,044,848, entitled "Fresh Air Intake for a Vehicle", issued on 16 May 2006, and which is hereby incorporated herein by reference. Locating an air intake high-up on the vehicle can also help avoid water intake if, for example, the vehicle is used to launch a boat. In such situations, a lower portion of the vehicle may become submerged; thus, it may be an added benefit to locate the air intake above the boat launch water line. Such an air intake can also be beneficial for off-road driving.

Returning to FIG. 1, it is seen that the cooling system 10 includes a duct system 22, which, as explained more fully below, can selectively provide communication between the air intake 16 and the battery assembly 12. The duct system 22 is also configured to inhibit airflow between the duct system 22 and a vehicle passenger compartment, for example, passenger compartment 24 shown in FIG. 3. Because the cooling system 10 is capable of receiving air from outside the vehicle through the air intake 16, and because the duct system 22 is configured to inhibit airflow to or from the passenger compartment 24, the temperature of the air provided by the cooling system 10 to the battery assembly 12 is independent of the temperature of the passenger compartment 24.

Figure 4:
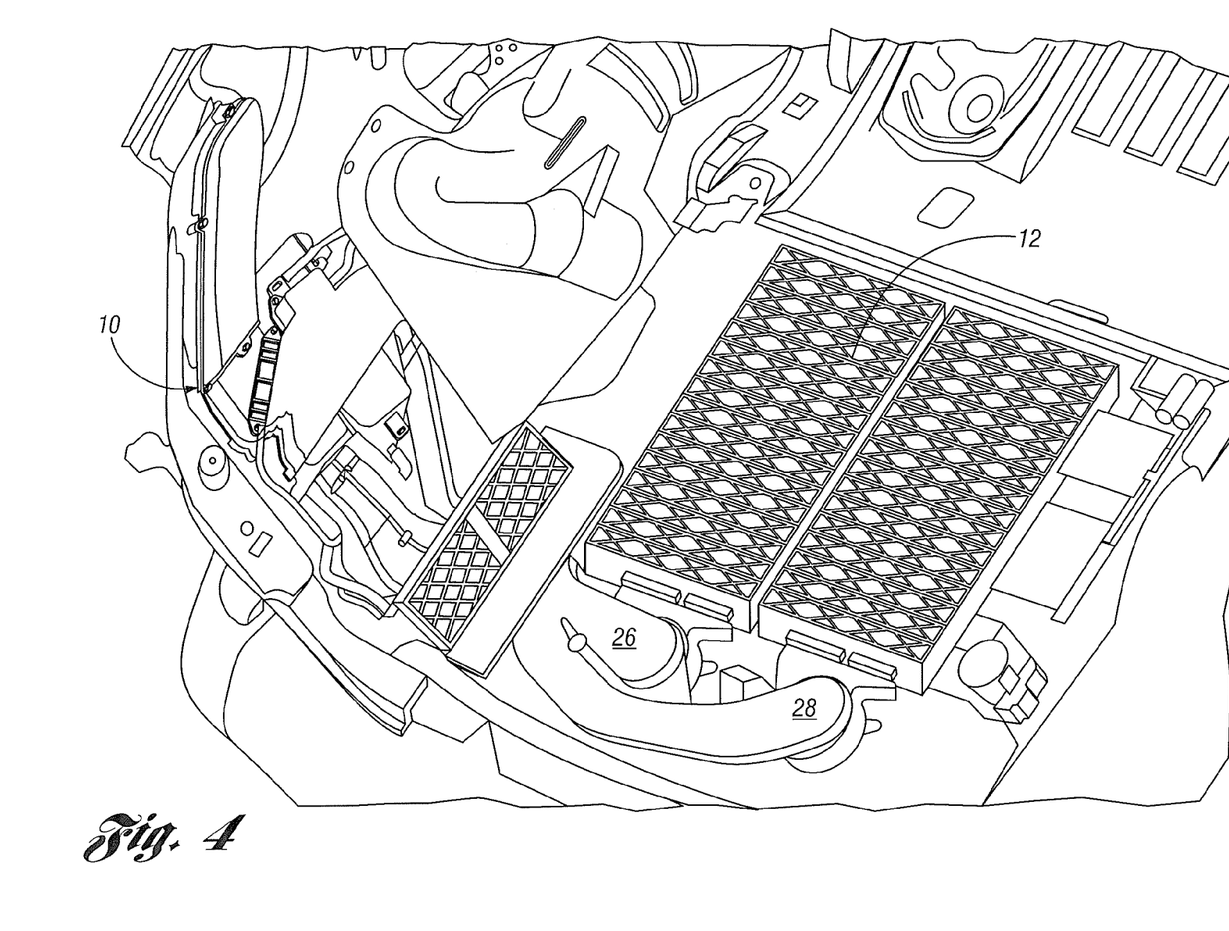
FIG. 4 is a partial fragmentary isometric view of a portion of the battery cooling system, including a pair of fans.
Figure 5:
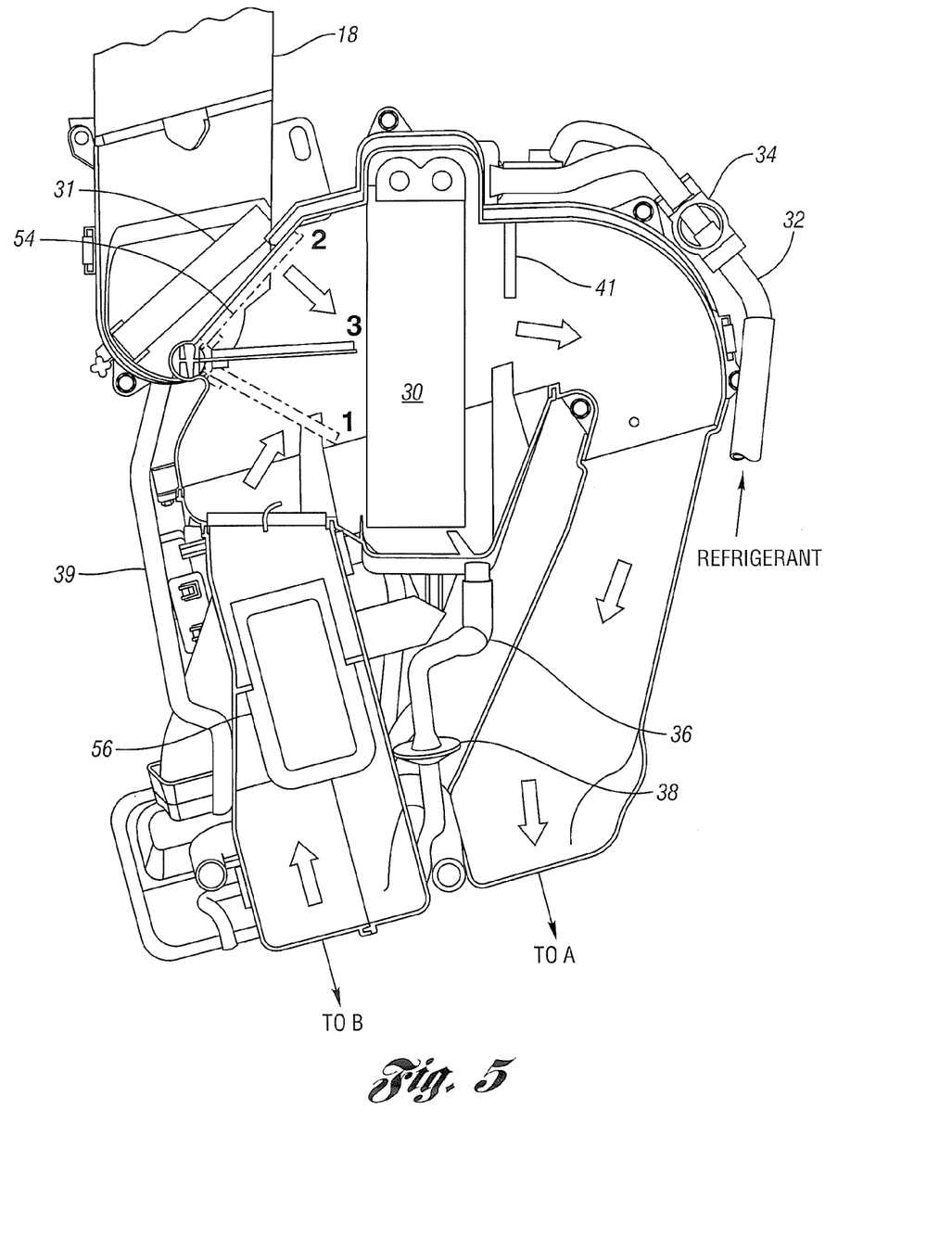
FIG. 5 is a partial fragmentary side view of a portion of the battery cooling system, including a pair of movable baffles.

As illustrated in FIG. 4, the cooling system 10 includes a pair of fans 26, 28 which move air through the duct system 22 and across the battery assembly 12. Although the embodiment shown in FIG. 4 includes two fans, one fan, or more than two fans, may be used to move the cooling air across the battery assembly 12. The cooling system 10 also includes a heat exchanger, which, in the embodiment shown in FIG. 5, is an evaporator coil 30. The evaporator coil 30 cooperates with the duct system 22, and can be selectively operated to cool the air flowing through the duct system 22 before it reaches the battery assembly 12. A heat exchanger, such as the evaporator coil 30, may be any one of a number of different types of heat exchangers which remove heat from the air flowing through the duct system 22.

Turning to FIG. 5, it is seem that an air filter 31 is disposed in the duct system 22 for filtering the air before it reaches the evaporator coil 30. In the embodiment shown in FIG. 5, the evaporator coil 30 is part of an air conditioning system. Such an air conditioning system may have more than one evaporator coil in the same system to cool different spaces within a vehicle. One such cooling system is described in U.S. Pat. No. 7,096,683, entitled "Vehicle Cooling System", issued on 29 Aug. 2006, and which is hereby incorporated herein by reference.

The evaporator coil 30, shown in FIG. 5, receives a refrigerant through a refrigeration line 32 when the ambient air outside the vehicle is too warm to adequately cool the battery assembly 12. Refrigerant in the refrigeration line 32 flows through a thermal expansion valve 34 prior to reaching the evaporator coil 30. Because condensation may occur as air flows through the evaporator coil 30, the cooling system 10 is provided with a drain line 36 to allow condensate to leave the duct system 22. A check valve 38 provides for one way flow, such that unfiltered air will not rise back into the duct system 22. A second drain line 39 is in communication with the vehicle air intake 18, for draining water that may be taken in from the ambient air outside the vehicle.

Also shown in FIG. 5 is a thermistor 41 configured to monitor the air temperature adjacent the evaporator coil 30. If the thermistor 41 senses a temperature that is below a predetermined temperature, the flow of refrigerant through the evaporator coil 30 is stopped. This prevents the undesirable build-up of ice on the evaporator coil 30.

Returning to FIG. 2, it is seen that the duct system 22 includes first, second and third duct subsystems 40, 42 and 44, respectively. The first duct subsystem 40 is disposed between the air intake 16 and the battery assembly 12, and provides an airflow path from the air intake 16 through the evaporator coil 30 and to the battery assembly 12. The second duct subsystem 42 is disposed between the battery assembly 12 and the first duct subsystem 40. The second duct subsystem 42 provides for recirculation of air from the battery assembly 12 back through the evaporator coil 30, and back to the battery assembly 12.

Recirculation of air in this manner is particularly useful when the ambient air outside the vehicle is too warm to adequately cool the battery assembly 12. Indeed, the temperature of the air flowing from the battery through the second duct subsystem 42 may still be significantly lower than the temperature of the ambient air outside the vehicle. In such cases, it is more efficient to further cool this air by passing it through the evaporator coil 30, rather than cooling the ambient air taken in through the air intake 16.

Another benefit to using the recirculating air, is that it may have a significantly lower moisture content than fresh air taken in from outside the vehicle. Thus, less condensate will form as the recirculating air passes through the evaporator coil 30. This also helps prevent icing of the evaporator coil 30. When the ambient air temperature outside the vehicle is low enough to adequately cool the battery assembly 12, the flow of refrigerant to the evaporator coil 30 can be stopped, and ambient air taken from outside the vehicle can be directly provided to the battery assembly 12. In such a case, the third duct subsystem 44 may be used to provide an airflow path from the duct system 22 to the ambient environment outside the vehicle 14 through an air outlet, or air extractor 46.

Figure 6:
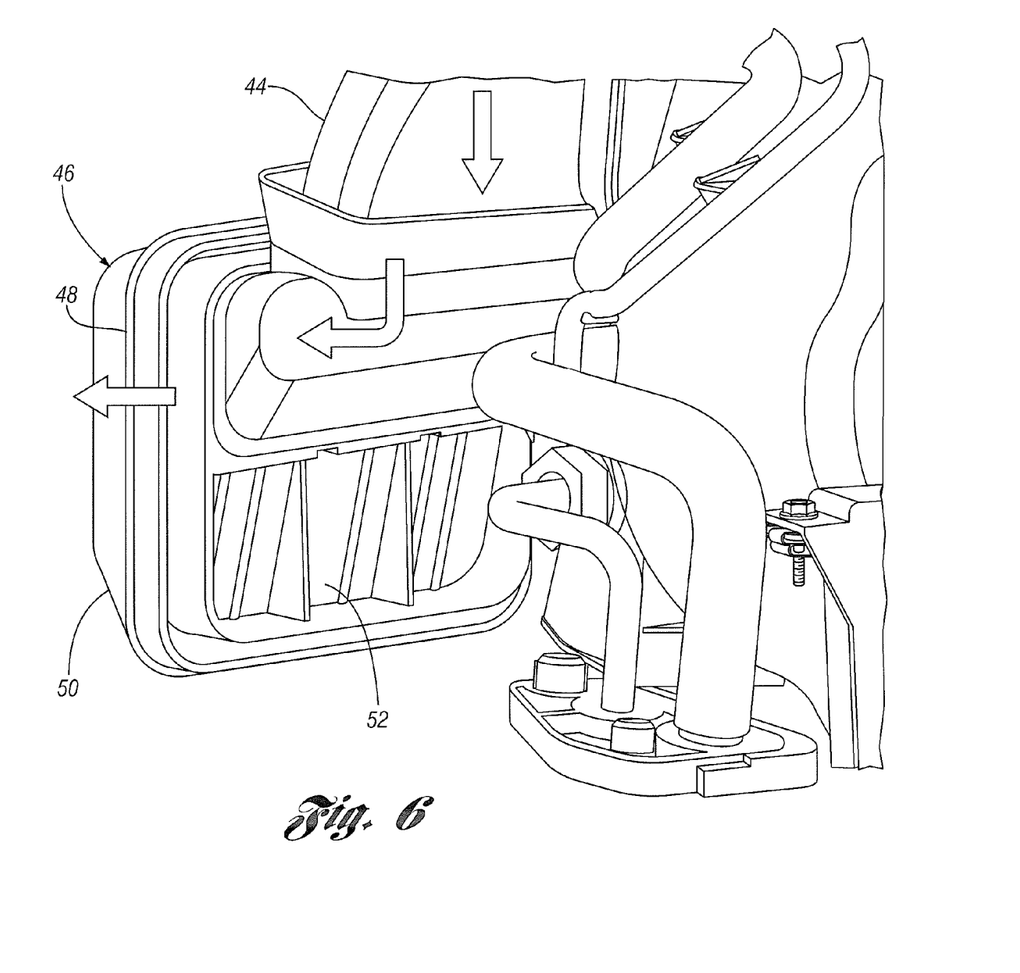
FIG. 6 is a partial fragmentary isometric view of a portion of the cooling system, including an air extractor.

FIG. 6 shows the air extractor 46 attached to the third duct subsystem 44. The air extractor 46 includes an upper portion 48 and a lower portion 50, both of which provide an outlet to the ambient environment outside the vehicle. The third duct subsystem 44 connects to the upper portion 48 of the air extractor 46. Although it is not shown in FIG. 6, the lower portion 50 may be connected to a duct, or series of ducts, that provide an airflow path from the passenger compartment 24. A flow inhibitor 52 is included in the lower portion 50 for inhibiting the flow of air from the third duct subsystem 44 through the air extractor 46, and back into the vehicle passenger compartment 24.

In the embodiment shown in FIG. 6, the flow inhibitor 52 is an approximately vertically oriented flap, pivotally attached to the air extractor 46, such that air flowing out of the third duct subsystem 44 tends to be expelled into the ambient environment outside the vehicle 14, rather than back into the passenger compartment 24. Even if some air does flow back into the vehicle passenger compartment 24, however, the volume of this back flow air would be negligible. Of course, other types of flow inhibitors may be used to inhibit the flow of air from the duct system 22 into the vehicle passenger compartment 24.

As best seen in FIG. 5, the duct system 22 includes first and second baffles 54, 56. The first baffle 54 is movable between a first position and a second position, shown in FIG. 5 by the numbers 1 and 2, respectively. When the first baffle 54 is in the first position, it facilitates airflow from the air intake 16 to the battery assembly 12 through the first duct subsystem 40. In the second position, the first baffle 54 facilitates airflow from the battery assembly 12 back to the first duct subsystem 40, through the second duct subsystem 42. This facilitates recirculation of air across the battery assembly 12, while at the same time, inhibiting the flow of air from the air intake 16 to the battery assembly 12.

The first baffle 54 is also movable to an intermediate position, designated in FIG. 5 by the number 3. While in the intermediate position, the first baffle 54 facilitates airflow from the air intake 16 to the battery assembly 12 through the first duct subsystem 40, and at the same time, facilitates the recirculation of air from the battery assembly 12 through the second duct subsystem 42, and back to the battery assembly 12.

The second baffle 56 is also movable between first, second and intermediate positions. The second baffle 56 can be placed in the first position to facilitate airflow through the third duct subsystem 44 and out of the air extractor 46 to the ambient environment outside the vehicle 14. This position may be used when ambient air is drawn in through the air intake 16, and the cooling system 10 is not in a recirculation mode. Conversely, the second baffle 56 can be placed in a second position, which inhibits airflow through the third duct subsystem 44, and facilitates recirculation of air from the battery assembly 12, through the evaporator coil 30, and back to the battery assembly 12. The second baffle 56 is also movable to an intermediate position, as shown in FIG. 5, wherein some of the air flowing through the second duct subsystem 42 is diverted back to the battery assembly 12 for recirculation, while some of the air is routed through the third duct subsystem 44, and expelled through the air extractor 46.

Figure 7:
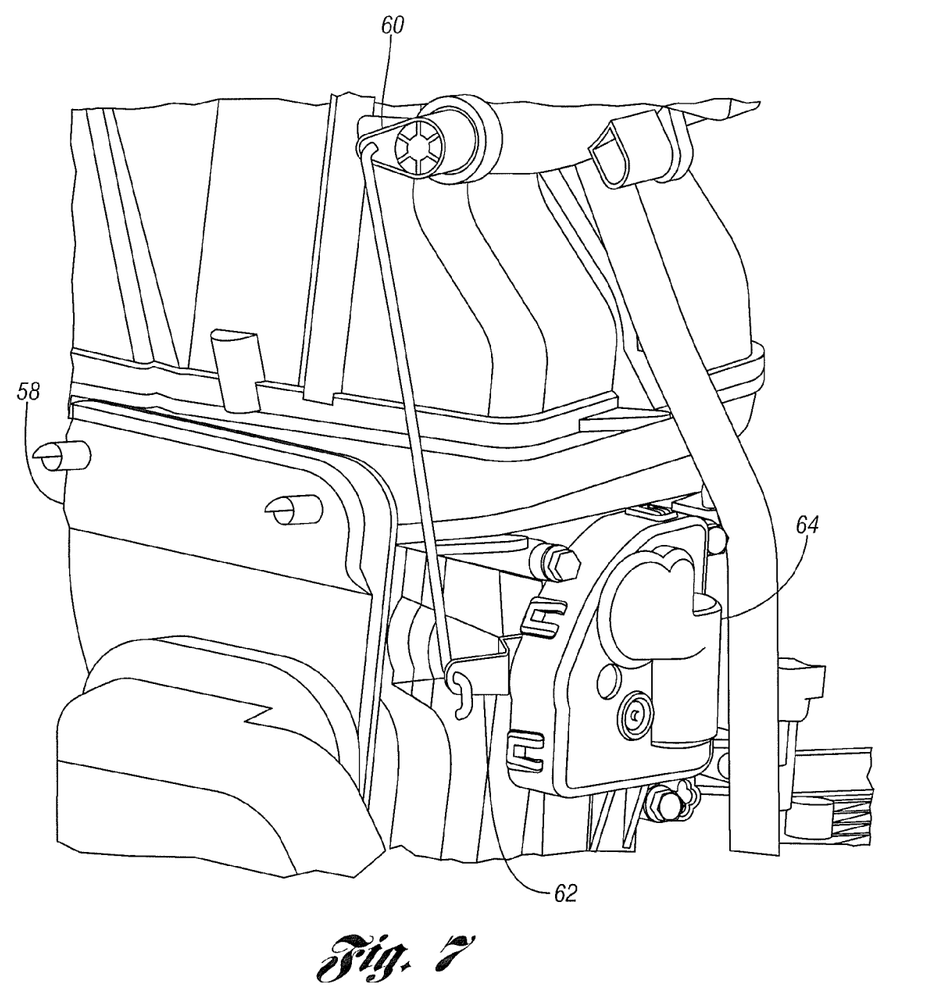
FIG. 7 is a partial fragmentary isometric view of a portion of the battery cooling system, including a mechanism for moving the movable baffles.

When the first baffle 54 is in the first position, it will often be desirable to have the second baffle 56 also in the first position. This facilitates the intake of fresh air through the air intake 16 to cool the battery assembly 12, and the expulsion of the air from the vehicle 14 through the air extractor 46. Similarly, when the first baffle 54 is in the second position, it will often be desirable to have the second baffle 56 in the second position. This facilitates recirculation of air from the battery assembly 12 through the evaporator coil 30, and back to the battery assembly 12. As discussed above, such an arrangement may be more energy efficient than cooling the air taken in from the ambient environment outside the vehicle. In order to facilitate synchronous operation of the first and second baffles 54, 56, the cooling system 10 includes a mechanical linkage 58, shown in FIG. 7, that connects lever arms 60, 62, which can be used to move the baffles 54, 56 to and from different positions. An electric actuator 64 is provided for moving the baffles 54, 56 to their desired positions.

Figure 8:
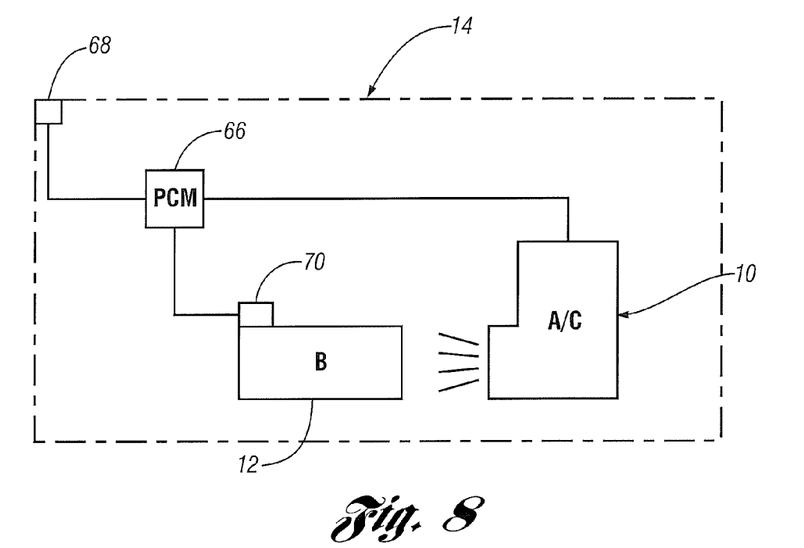
FIG. 8 is a schematic representation of a control system used to control the battery cooling system.

In order to control the electric actuator 64, as well as other elements of the cooling system 10, a controller, such as a powertrain control module (PCM) 66, shown in FIG. 8, may be used. FIG. 8 illustrates a simple schematic control system for the cooling system 10. The PCM 66 is connected to the cooling system 10, and to a number of inputs, in particular temperature sensors 68, 70. The first temperature sensor 68 is configured to measure a temperature indicative of the temperature of the ambient environment outside the vehicle. For example, the temperature sensor 68 may be positioned such that the temperature of the ambient air outside the vehicle is directly measured.

Alternatively, the temperature sensor 68 could be a mass air temperature sensor commonly used in vehicle engine systems. In such a case, the temperature sensor 68 would not directly measure the temperature of the ambient air outside the vehicle. Rather, the temperature sensor 68 would measure the temperature of the air within the engine system, and a controller, such as the PCM 66, would use a preprogrammed algorithm, such as a lookup table, to correlate the measured temperature with the temperature of the ambient air outside the vehicle. Thus, the PCM 66 is provided with information from the temperature sensor 68 that allows the temperature of the ambient air outside the vehicle to be used by the PCM 66 in controlling the cooling system 10.

Similarly, the temperature sensor 70 measures a temperature that is indicative of the temperature of the battery 12, and sends a signal related to the measured temperature to the PCM 66. A temperature sensor, such as the temperature sensor 70, may directly measure the temperature of one or more of the battery cells in the battery assembly 12. Alternatively, a temperature sensor may be used to measure the temperature of the ambient air directly surrounding the battery assembly 12. Thus, the PCM 66 can use both the temperature of the ambient air outside the vehicle and the temperature of the battery assembly 12 to help control the cooling system 10.

The PCM 66 is configured to control the various elements of the cooling system 10, such as the operation of the fans 26, 28, the flow of refrigerant to the heat exchanger 30, and the movement of the first and second baffles 54, 56. Of course, a single controller, such as the PCM 66, which may be used to control a wide variety of powertrain systems, does not need to be used to directly control a cooling system, such as the cooling system 10. For example, the cooling system 10 may have a separate controller, configured to communicate with a PCM, and to receive signals such as those output by the temperature sensor 70. In addition, the battery assembly 12, may have its own traction battery control module (TBCM) that communicates with a separate cooling system controller and/or a PCM. Thus, there are any number of ways to control a cooling system, such as the cooling system 10, with the one illustrated in FIG. 8 providing but one example.

Figure 9:
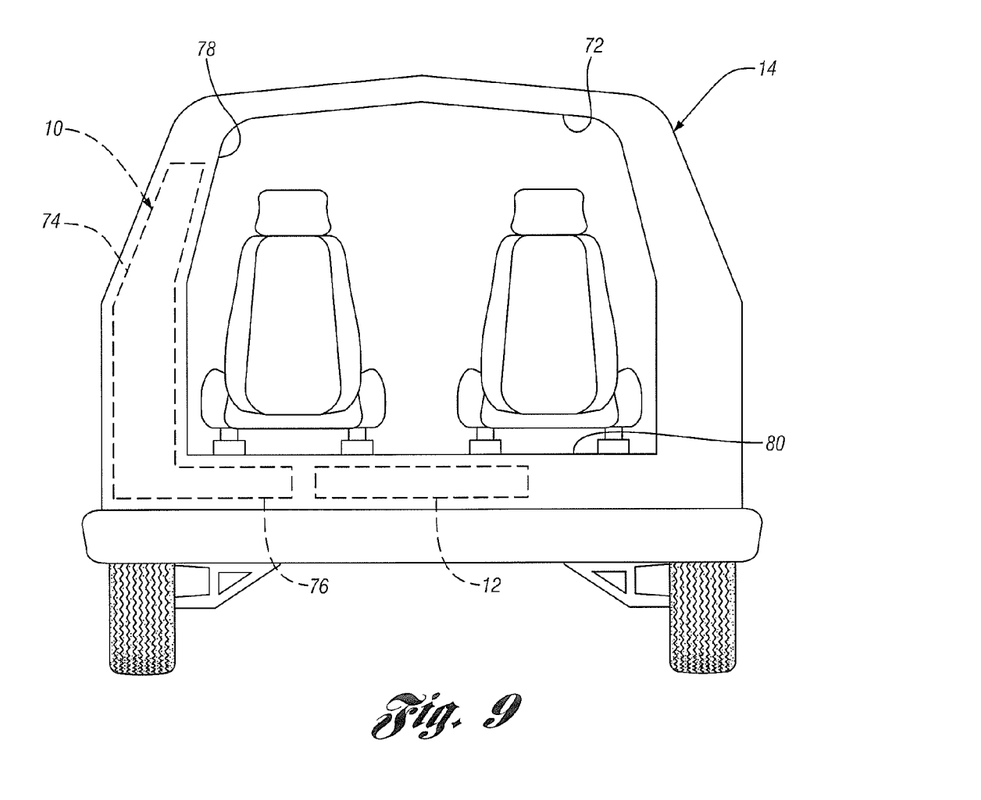
FIG. 9 is a rear plan view of a vehicle, illustrating the compact nature of the battery cooling system.

The cooling system 10 can also be conveniently packaged to fit in a vehicle without unduly limiting the space available for passengers and cargo. For example, FIG. 9 shows the rear portion of the vehicle 14 having a rear vehicle opening 72. Typically, a rear vehicle opening, such as the opening 72, will be covered by a tailgate and a back light, which have been removed from this view for clarity. As shown schematically in FIG. 9, the cooling system 10 includes a first portion 74, and a second portion 76. The first portion 74 is adjacent the rear vehicle opening 72, and it is configured to provide substantially uninhibited access to the passenger compartment 24 through the opening 72.

In the embodiment shown in FIG. 9, the first portion 74 does not extend beyond an edge 78 of the rear vehicle opening 72. Of course, different styles of vehicles may require the first portion 74 to extend slightly beyond the edge of 78 of the rear vehicle opening 72; however, access to the passenger compartment 24 can still be substantially uninhibited. This provides convenient access to and from the passenger compartment 24 through the rear vehicle opening 72, without encountering interference from a cooling system that extends substantially beyond an edge of a rear vehicle opening, such as the opening 72.

Similarly, the second portion 76 of the cooling system 10 is disposed beneath a load floor 80, and is adjacent the battery assembly 12. The second portion 76 maintains a low profile, such that the load floor 80 can remain substantially level throughout the rear portion of the vehicle 14. This provides for use of the load floor 80 without interference from raised portions which may be inconvenient for passengers and cargo storage alike. Thus, the cooling system 10 serves the important function of cooling a battery or battery assembly, with little or no sacrifice of the space in the vehicle interior.

While the best mode for carrying out the invention has been described in detail, those familiar with the art to which this invention relates will recognize various alternative designs and embodiments for practicing the invention as defined by the following claims.

What is claimed:

1. A cooling system for a battery in a vehicle having a passenger compartment, the cooling system comprising:
   an air intake for receiving air from an ambient environment outside the vehicle;
   a duct system capable of providing communication between the air intake and the battery, the duct system being configured to inhibit air flow between the duct system and the vehicle passenger compartment, the duct system including a first structure movable between a first position for facilitating communication between the air intake and the battery, while inhibiting recirculation of air across the battery, and a second position for inhibiting communication between the air intake and the battery, while facilitating recirculation of air across the battery;
   a fan cooperating with the duct system for moving air through at least a portion of the duct system and across the battery; and
   a heat exchanger cooperating with the duct system and selectively operable to cool air flowing in the duct system before the flowing air reaches the battery.

2. The cooling system of claim 1, further comprising an air outlet configured to facilitate air flow from the duct system to the ambient environment outside the vehicle.

3. The cooling system of claim 2, wherein the air outlet includes first and second portions, the first portion being in communication with the duct system, and the second portion being in communication with the vehicle passenger compartment, the second portion including a flow inhibitor for inhibiting air flow from the duct system to the vehicle passenger compartment.

4. The cooling system of claim 1, wherein the first structure is movable to an intermediate position which facilitates communication between the air intake and the battery, and recirculation of air across the battery.

5. The cooling system of claim 1, further comprising an air outlet configured to facilitate air flow from the duct system to the ambient environment outside the vehicle, and
   wherein the duct system further includes a second structure movable between a first position for facilitating air flow from the duct system through the air outlet, and a second position for inhibiting air flow from the duct system through the air outlet.

6. The cooling system of claim 5, wherein movement of the first and second structures is synchronous.

7. The cooling system of claim 5, further comprising:
   a first sensor configured to measure a temperature indicative of the ambient environment outside the vehicle, and to output a signal related to the ambient temperature;
   a second sensor disposed in relation to the battery for measuring a temperature indicative of battery temperature, the second sensor being configured to output a signal related to the battery temperature; and
a controller configured to receive the signals output from the first and second sensors, and to control the operation of the fan, the heat exchanger, and the first and second structures, at least partly based on the signals received.

8. A cooling system for a battery in a vehicle having a passenger compartment, the cooling system comprising:
an air intake for receiving ambient air from outside the vehicle;
a duct system configured to inhibit air flow between the duct system and the vehicle passenger compartment, and including first and second duct subsystems, the first duct subsystem being disposed between the air intake and the battery for providing an air flow path from the air intake to the battery, the second duct subsystem being disposed between the battery and the first duct subsystem for providing an air flow path from the battery to the first duct subsystem, thereby facilitating recirculation of air across the battery, the duct system being configured to selectively inhibit air flow through at least a portion of the first and second duct subsystems;
a fan cooperating with the duct system for moving air through at least a portion of the duct system and across the battery; and
a heat exchanger cooperating with the duct system and selectively operable to cool air flowing in the duct system before the flowing air reaches the battery.

9. The cooling system of claim 8, wherein the duct system further includes a first baffle movable between first and second positions, the first position facilitating air flow from the air intake to the battery through the first duct subsystem, the second position facilitating air flow from the battery to the first duct subsystem through the second duct subsystem.

10. The cooling system of claim 9, wherein the first baffle is movable to an intermediate position for facilitating air flow through the first and second duct subsystems.

11. The cooling system of claim 9, further comprising an air outlet communicating with the ambient environment outside the vehicle, and wherein the duct system further includes a third duct subsystem cooperating with the air outlet to provide an air flow path to the ambient environment outside the vehicle.

12. The cooling system of claim 11, wherein the air outlet includes first and second portions, the first portion being in communication with the duct system, and the second portion being in communication with the vehicle passenger compartment, the second portion including a flow inhibitor for inhibiting air flow from the duct system to the vehicle passenger compartment.

13. The cooling system of claim 11, wherein the duct system includes a second baffle movable between a first position for facilitating air flow through the third duct subsystem, and a second position for inhibiting air flow through the third duct subsystem.

14. The cooling system of claim 13, wherein movement of the first and second baffles is synchronous.

15. The cooling system of claim 13, further comprising:
a first sensor configured to measure a temperature indicative of the ambient environment outside the vehicle, and to output a signal related to the ambient temperature;
a second sensor disposed in relation to the battery for measuring a temperature indicative of battery temperature, the second sensor being configured to output a signal related to the battery temperature; and
a controller configured to receive the signals output from the first and second sensors, and to control the operation of the fan, the heat exchanger, and the first and second baffles, at least partly based on the signals received.

16. A vehicle having a passenger compartment, a window assembly and a battery, the vehicle comprising:
a battery cooling system including:
an air intake disposed in a portion of the window assembly for receiving air from an ambient environment outside the vehicle,
a duct system configured to selectively provide communication between the air intake and the battery, and further configured to inhibit communication between the passenger compartment and the battery,
a fan cooperating with the duct system for moving air through at least a portion of the duct system and across the battery, and
a heat exchanger cooperating with the duct system and selectively operable to cool air flowing in the duct system before the flowing air reaches the battery.

17. The vehicle of claim 16 having a rear vehicle opening and a load floor having the battery disposed therebeneath, wherein the battery cooling system further includes first and second portions, the first portion being adjacent the rear vehicle opening and configured to provide substantially uninhibited access to the passenger compartment through the opening, the second portion being disposed beneath the load floor, adjacent the battery.

18. The vehicle of claim 16, wherein the duct system includes a baffle movable between a first position for facilitating communication between the air intake and the battery, while inhibiting recirculation of air across the battery, and a second position for inhibiting communication between the air intake and the battery, while facilitating recirculation of air across the battery.

19. The vehicle of claim 18, wherein the battery cooling system further includes first and second sensors in communication with a controller, the first sensor being configured to measure a temperature indicative of the ambient environment outside the vehicle and to output a signal related to the ambient temperature, the second sensor being disposed in relation to the battery for measuring a temperature indicative of battery temperature, the second sensor being configured to output a signal related to the battery temperature, the controller being configured to receive the signals output from the first and second sensors, and to control the operation of the fan, the heat exchanger, and the baffle, at least partly based on the signals received.

* * * * *

UNITED STATES PATENT AND TRADEMARK OFFICE
CERTIFICATE OF CORRECTION

PATENT NO.       : 7,607,501 B2
APPLICATION NO. : 11/276064
DATED            : October 27, 2009
INVENTOR(S)      : Smith et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 221 days.

Signed and Sealed this

Twelfth Day of October, 2010

David J. Kappos
*Director of the United States Patent and Trademark Office*